US010740610B2

(12) United States Patent
Rees et al.

(10) Patent No.: US 10,740,610 B2
(45) Date of Patent: Aug. 11, 2020

(54) METHODS, SYSTEMS, AND DEVICES RELATING TO SHADOW DETECTION FOR REAL-TIME OBJECT IDENTIFICATION

(71) Applicant: UNIVERSITY OF SOUTHERN QUEENSLAND, Toowomba, Queensland (AU)

(72) Inventors: Steven Rees, Top Camp (AU); Matthew Tscharke, Highfields (AU)

(73) Assignee: UNIVERSITY OF SOUTHERN QUEENSLAND, Toowoomba, Queensland (AU)

(*) Notice: Subject to any disclaimer, the term of this patent is extended or adjusted under 35 U.S.C. 154(b) by 80 days.

(21) Appl. No.: 16/160,679

(22) Filed: Oct. 15, 2018

(65) Prior Publication Data
US 2019/0095710 A1 Mar. 28, 2019

Related U.S. Application Data

(63) Continuation-in-part of application No. PCT/AU2017/050340, filed on Apr. 14, 2017.
(Continued)

(51) Int. Cl.
*G06K 9/00* (2006.01)
*G06T 5/40* (2006.01)
(Continued)

(52) U.S. Cl.
CPC ........ *G06K 9/00657* (2013.01); *A01C 21/005* (2013.01); *A01M 7/0089* (2013.01);
(Continued)

(58) Field of Classification Search
CPC combination set(s) only.
See application file for complete search history.

(56) References Cited

U.S. PATENT DOCUMENTS 6,072,588 A * 6/2000 Dohnomae .......... H04N 1/6011
358/1.9
6,198,844 B1 * 3/2001 Nomura ............... H04N 1/4074
382/168
(Continued)

FOREIGN PATENT DOCUMENTS

WO WO 1998/046065 A1 10/1998
WO WO 2007/145654 A1 12/2007
(Continued)

OTHER PUBLICATIONS

Burgos-Artizzu, X. P. et al., "Analysis of natural images processing for the extraction of agribultural elements", Image and Vision Computing 28 (2010), pp. 138-149.
(Continued)

*Primary Examiner* — Alex Kok S Liew
(74) *Attorney, Agent, or Firm* — Birch, Stewart, Kolasch & Birch, LLP (57) ABSTRACT

The automated treatment of agricultural fields allows precise application of treatment to only areas of the field requiring treatment, allowing reduced use of agricultural products such as pesticides and the related reduction in environmental stress. Such automated treatment requires the monitoring of image information of the field to detect objects of interest such as weeds. Such monitoring of image information of the field suffers from the real world problem of shadows cast from the agricultural equipment and/or adjacent trees or structures that cast shadows across the field. Shadows are extracted from the image data by smoothing the data, and developing a shadow mask by employing an intensity histogram and identifying a local minima in the darker intensities of the histogram to identify a shadow threshold. The image areas within the shadow area detected by said mask
(Continued)

are then corrected by multiplication with correction coefficients to extract the shadow.

19 Claims, 7 Drawing Sheets

Related U.S. Application Data

(60) Provisional application No. 62/323,173, filed on Apr. 15, 2016.

(51) Int. Cl.

| | | |
|---|---|---|
| *G06T 7/73* | (2017.01) | |
| *G06K 9/34* | (2006.01) | |
| *G06T 5/20* | (2006.01) | |
| *A01C 21/00* | (2006.01) | |
| *A01M 7/00* | (2006.01) | |
| *A01M 21/04* | (2006.01) | |
| *G06K 9/46* | (2006.01) | |
| *G06T 5/00* | (2006.01) | |
| *G06K 9/44* | (2006.01) | |

(52) U.S. Cl.
CPC .......... *A01M 21/043* (2013.01); *G06K 9/346* (2013.01); *G06K 9/4647* (2013.01); *G06T 5/002* (2013.01); *G06T 5/008* (2013.01); *G06T 5/20* (2013.01); *G06T 5/40* (2013.01); *G06T 7/73* (2017.01); *G06K 9/44* (2013.01); *G06T 2207/10024* (2013.01); *G06T 2207/20072* (2013.01); *G06T 2207/20208* (2013.01)

(56) References Cited

U.S. PATENT DOCUMENTS

| | | |
|---|---|---|
| 8,619,151 B2 | 12/2013 | Park et al. |
| 2001/0036295 A1 | 11/2001 | Hendrickson et al. |
| 2007/0110309 A1 | 5/2007 | Ibrahim et al. |
| 2010/0322476 A1* | 12/2010 | Kanhere .............. G08G 1/0175 382/103 |
| 2011/0211754 A1* | 9/2011 | Litvak ................ G06K 9/00375 382/165 |
| 2012/0219218 A1 | 8/2012 | Demandolx |
| 2015/0015697 A1* | 1/2015 | Redden .................. G01B 11/24 348/89 |

FOREIGN PATENT DOCUMENTS

| | | |
|---|---|---|
| WO | WO 2012/094116 A1 | 7/2012 |
| WO | WO 2014/165787 A1 | 10/2014 |
| WO | WO 2015/127397 A1 | 8/2015 |
| WO | WO 2016/025848 A1 | 2/2016 |

OTHER PUBLICATIONS

Examination Report No. 1 for Standard Patent Application issued in corresponding Australian Application No. 2018250354 on Nov. 18, 2019.

Gee, C. et al., "Crop/weed discrimination in perspective agronomic images", Computers and Electronics in Agriculture 60 (2008, pp. 49-59.

Tellaeche, A. et al., "A new vision-based approach to differential spraying in precision agriculture", Computers and Electronics in Agriculture 60 (2008), pp. 144-155.

* cited by examiner

| 1 | 2 | 3 |
|---|---|---|
| 8 | Pixel of interest | 4 |
| 7 | 6 | 5 |

METHODS, SYSTEMS, AND DEVICES RELATING TO SHADOW DETECTION FOR REAL-TIME OBJECT IDENTIFICATION

CROSS-REFERENCE TO RELATED APPLICATION(S)

This application is a Continuation-in-Part of PCT International Application No. PCT/AU2017/050340 filed Apr. 14, 2017 entitled "Methods, Systems, and Devices Relating to Shadow Detection for Real-Time Object Identification," and further claims priority under 35 U.S.C. § 119(e) to U.S. Provisional Application 62/323,173, filed Apr. 15, 2016 having the same name. The entirety of the specification of the above applications are hereby incorporated herein by reference in their entirety.

FIELD OF THE INVENTION

The various embodiments disclosed herein relate to systems and methods for shadow detection used in object identification, including real-time identification of plants during the traversal of a. Some specific exemplary embodiments include systems and methods for automated object selection, driverless vehicles, or plant identification.

BACKGROUND OF THE INVENTION

As farming practices have changed, so have the methods for treatment of plants in the field. The increased uptake of conservation farming practices—including minimum-till and no-till practices—has seen an increase in herbicide (and other types of pesticides) usage for the control of weeds, and this increase in usage is causing selective breeding of tolerance characteristics (also known as "resistance" in the farming industry) to the herbicide in successive generations. Currently, the standard technique for breaking this tolerance is to use a herbicide with a different killing action (which is often more expensive than the herbicides already being used) and/or mechanical cultivation. Typically, the herbicide is applied with a boom sprayer that either sprays herbicide in a broadcast manner on both the weeds and the crops or is focused such that the herbicide is only applied in the area between the crop rows. In either method, the herbicide is sprayed continually across the field.

One alternative cost efficient way to apply the different, more costly "specific action" or "selective" herbicides is through automatic spot spraying of the weeds. However, current commercial spot spraying technologies are only capable of recognizing the presence of vegetation (distinguishing plants from background such as soil or stubble)—the technologies do not have the ability to identify the specific vegetation and thus can't distinguish weed plants from crop plants. Further, additional experimental technologies have been developed for controlled conditions and consequently are not suitable to achieve a workable commercial solution.

In addition, there is the possibility of applying a variety of other agricultural chemicals such as pesticides, barrier treatments, or even spot treatment of fertilizers, using image recognition of the features to be sought to identify a point or area of treatment in an agricultural field.

Machine vision technologies are used in a variety of different systems and methods, including, for example, driverless vehicles, automated object selection, and various other vision-aided robotic or automated systems. Several methods have been used for segmenting objects in the various machine vision technologies. In these various systems, varied lighting conditions can impact the effectiveness of the known machine vision technology and segmentation processes. One method for addressing the varied lighting conditions is a shadow detection process. However, known shadow detection processes have limitations, including incorrect segmentation caused by variation in the color of the light source and are not particularly applicable to treatment of an agricultural crop in a field without adaptation. For example, the color variation in the light source degrades the segmentation quality so that either plant material captured in the image is missed or portions of non-plant material are incorrectly categorized as plant material.

Another problem with the known process of real-time shadow detection and correction is processing time. That is, the known methods do not have the processing speed necessary for real-time systems usable for the real time processing of shadows in a system for detection and treatment in an agricultural field. Processing time is limited in real-time systems such as automated spot spraying or vision guidance systems where the frame rate may need to be, for example, 30 frames per second ("FPS") or faster. In such exemplary known systems, a frame rate of 30 FPS or faster leaves less than 33 milliseconds ("ms") to compensate for shadows and daylight, identify the presence of the target object (such as a weed or crop row, for example), and determine the action required. The known methods cannot operate at that speed.

There is a need in the art for improved systems and methods for shadow detection in real-time feature identification, particularly real time detection of plants in an agricultural treatment system.

BRIEF SUMMARY OF THE INVENTION

Discussed herein are various real-time and real-world environment shadow detection systems and methods for use in object identification and in particular plant identification in a field during a selective field treatment process.

In Example 1, a real-time and real-world environment method of shadow detection comprises applying a smoothing filter to an original image to create a smoothed image, determining an intensity threshold in the smoothed image, and creating a mask based on the intensity threshold so as to identify and classify individual plants in an agricultural field.

Example 2 relates to the method according to Example 1, wherein the applying the smoothing filter comprises replacing a pixel intensity value of each pixel of interest in the image with a mean intensity value of neighboring pixels. Such smoothing is particularly applicable in the extraction of shadows created by machinery and other large objects, for example trees shadowing the planting so at to enhance detection of individual plants in an agricultural field Example 3 relates to the method according to Example 2, wherein the neighboring pixels comprise a window of pixels surrounding the pixel of interest.

Example 4 relates to the method according to Example 3, wherein the window of pixels comprises a 3×3 area of pixels, a 10×10 area of pixels, or a 20×20 area of pixels.

Example 5 relates to the method according to Example 1, wherein the determining the intensity threshold in the smoothed image comprises creating a graphical summary of pixel intensities in the smoothed image and determining the intensity threshold based on the graphical summary.

Example 6 relates to the method according to Example 5, wherein the graphical summary is a histogram, and further wherein the determining the intensity threshold comprises identifying the minima between peaks in the histogram.

Example 7 relates to the method according to Example 1, wherein the providing the original image comprises providing the original image in a grayscale image, a color image, a depth image, a fluorescence image, a thermal image, or an infrared image.

Example 8 relates to the method according to Example 7, wherein the providing the original image in the grayscale image comprises capturing the original image in the grayscale image or converting the original image to the grayscale image.

Example 9 relates to the method according to Example 1, wherein the mask comprises a binary mask image.

Example 10 relates to the method according to Example 1, further comprising identifying shadowed regions in the original image by overlaying the mask over a color version of the original image.

Example 11 relates to the method according to Example 1, further comprising applying a color correction method to the mask.

In Example 12, a real-time and real-world environment plant identification system comprises a central controller component comprising a processor, a vision system operably coupled to the central controller component, the vision system configured to capture at least one original image of a target area, and a shadow detection module associated with the central controller component. The shadow detection module is configured to apply a smoothing filter to the at least one original image to create a smoothed image, determine a threshold in the smoothed image, create a mask based on the threshold; and identify shadowed regions in the at least one original image by overlaying the mask over the at least one original image.

Example 13 relates to the system according to Example 12, wherein the vision system is further configured to capture the at least one original image as a grayscale image.

Example 14 relates to the system according to Example 12, wherein the shadow detection module is further configured to convert the at least one original image to a grayscale image.

Example 15 relates to the system according to Example 12, wherein the mask comprises a binary mask image.

Example 16 relates to the system according to Example 12, further comprising a color correction module associated with the central controller component, wherein the color correction module is configured to determine an amount of color correction based on the mask.

In Example 17, a real-time and real-world environment method of shadow detection comprises applying a smoothing filter to an original image to create a smoothed image, creating a graphical summary of pixel intensities in the smoothed image, identifying a minima between peaks in the graphical summary to determine an intensity threshold in the smoothed image, and creating a mask based on the intensity threshold.

Example 18 relates to the method according to Example 17, wherein the graphical summary is a histogram.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed herein relate to real-time systems for identifying specific plants during treatment in a field under real-world conditions utilizing an improved method of shadow detection. In other implementations, the various systems can use the shadow detection method in combination with a shadow treatment method which may include a color correction method. Specific embodiments relate to systems and methods for identifying specific plant species amongst several plant species after utilizing the shadow detection process, and, in some cases, and the color correction process as well. In all the various systems and applications disclosed or contemplated herein, it is understood that the improved shadow detection methods and systems address varied lighting conditions to remove shadows from images and thereby process the images correctly for further use depending on the system or application.

The automated identification of one or more specific objects amongst others utilizes machine vision technology. For purposes of this application, "machine vision" is the analysis of images to extract data for controlling a process or activity—it can be used to automate tasks typically performed by human visual inspection. In the various implementations herein, the machine vision technology is configured to identify specific objects and in particular to distinguish between different plants within an agricultural field or to identify plants as compared to bare field or agricultural stubble, such as that produced by prior harvesting of the agricultural field. As used herein, agricultural field refers to an agricultural plot, whether indoors or outdoors where discrimination of plants or plant characteristics as compared to non-plant or different plant material is to be effected or used in agricultural husbandry.

Alternatively, various system, method, and device embodiments described herein relate to shadow detection in real-time identification of plants, particularly weed plants amongst crop plants, to facilitate selective treatment such as by spraying those weed plants with a pesticide in real world (as opposed to testing or lab) conditions. Alternative embodiments relate to selectively killing those weed plants by any other known means. Further implementations relate to incorporation of the various systems, methods, and devices disclosed and contemplated herein into either ground-based or aerial platforms, particularly systems for identifying a target plant from a plant or non-plant background.

For purposes of this application, the term "real-time" describes a system that produces a correct result within a specified time sufficiently fast to enable the intended treatment to be performed on the same pass of the agricultural equipment that created the image to be processed, and more specifically for purposes of this application describes a machine vision system that is able to identify objects within the field as the system progresses at an effective working speed. The systems, devices, and methods can be used in real world conditions that include a myriad of variations during use.

It is also understood that the various systems, methods, and embodiments disclosed and contemplated herein can be used for any purpose that relates to identification of one or more specific objects amongst several different objects in situations in which shadows may be encountered in agricultural field application. Exemplary applications may include object detection and sorting, including high-speed object sorting, such as the type of sorting necessary for conveyor-based operations relating to harvesting of crops.

The various embodiments are configured to detect the bright and shadowed regions in an image scene obtained from an agricultural field and for detecting the presence of a target object, such as, for example, plant material, or even a specific type of plant as compared to other plants in the field. In certain embodiments in which the target is plant material, the systems, devices, and methods enable the application of algorithms capable of segmenting plant material from background in real-time, real-world, no-till and traditional tillage situations. In a specific example, the various shadow detection embodiments disclosed or contemplated herein can be used in combination with the object identification systems, methods, and devices disclosed in pending International Application PCT/US15/29261, which was filed on May 5, 2015 and is entitled "Methods, Systems, and Devices Relating to Real-Time Object Identification," which is hereby incorporated herein by reference in its entirety. It is understood that the various shadow detection systems and methods can be incorporated as a module or method into any of the object identification embodiments disclosed in the '261 Application.

It is understood that color correction can also be utilized in the object detection process and/or to further enhance the shadow identification. The various embodiments disclosed or contemplated herein can be used in conjunction with a color correction method that determines the amount of color correction in an image scene by finding the intensity and color of the light source and identifying the bright and shadowed regions and the intensity of the image scene. The system and method, which are disclosed in pending International Application PCT/IB2017/050719, which was filed on Feb. 9, 2017 and is entitled "Imaging Device with White Balance Compensation and Related Systems and Methods," which is hereby incorporated herein by reference in its entirety, use a camera directed toward the light source to identify the intensity and color of that source.

The shadow detection process, according to one embodiment, includes the following steps, as explained in further detail below with respect to FIG. 8-10. First, an image is captured (S40, S101). Next, a smoothing filter is applied to the image which "blurs" the image (S105). After the smoothing filter is applied, a histogram is created of the pixel intensities in the smoothed image (S107). The histogram is then used to identify any shadow regions by finding the minima between the shadow peaks (reflecting lower intensities) and bright peaks (reflecting higher intensities) in the histogram (See FIG. 3, S115 of FIG. 9)) and thereby determining an intensity threshold that can then be applied to the smoothed image, thus creating a mask (S119). Finally, the mask is then overlaid on the color image of the same scene to identify the shadowed regions in the scene (S121 and FIG. 10).

This shadow detection process, according to one embodiment, will be explained in additional detail below.

Figure 1:
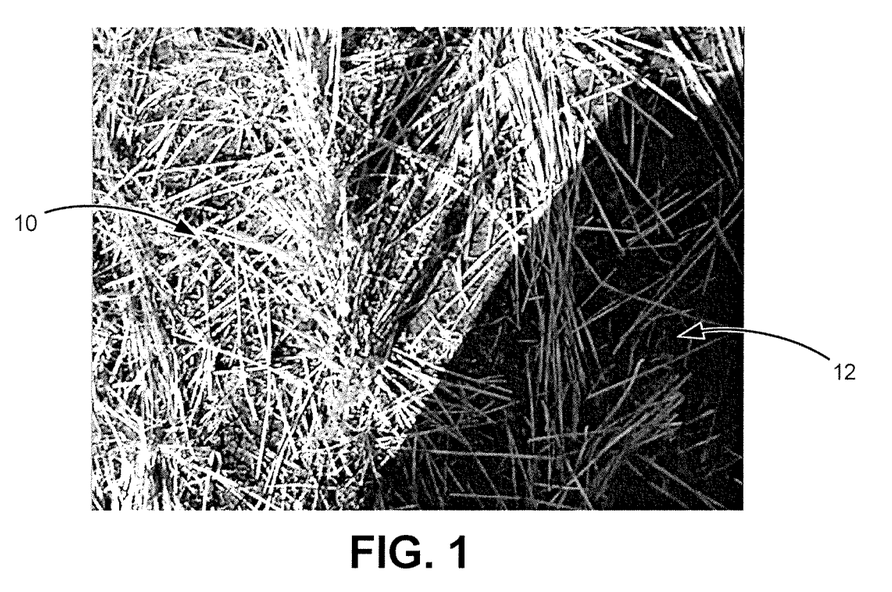
FIG. 1 is a photographic image of a real-world agricultural field environment in which shadowed and non-shadowed regions are to be identified.

FIG. 1 depicts an original image scene that will be analyzed using the shadow detection process, according to one embodiment, to identify any shadowed regions in the image obtained from an agricultural field. It should be noted that the image in FIG. 1 is a scene having a bright region 10 and a shadowed region 12. In accordance with one implementation, once the original image (like FIG. 1) is captured in color, it is converted into a grayscale image, and an averaging process is applied to the grayscale image. Alternatively, the image is captured in grayscale. In a further alternative, the averaging process can be applied to the image (including, for example, a color image) without the image first being converted into a grayscale image. The original captured image can be any known type of image, including, for example, a color, depth, thermal, infrared, or fluorescence image. Further, the shadow to be detected can originate from any known radiating energy source, including, for example, sunlight, heat, or artificial light.

Figure 5:
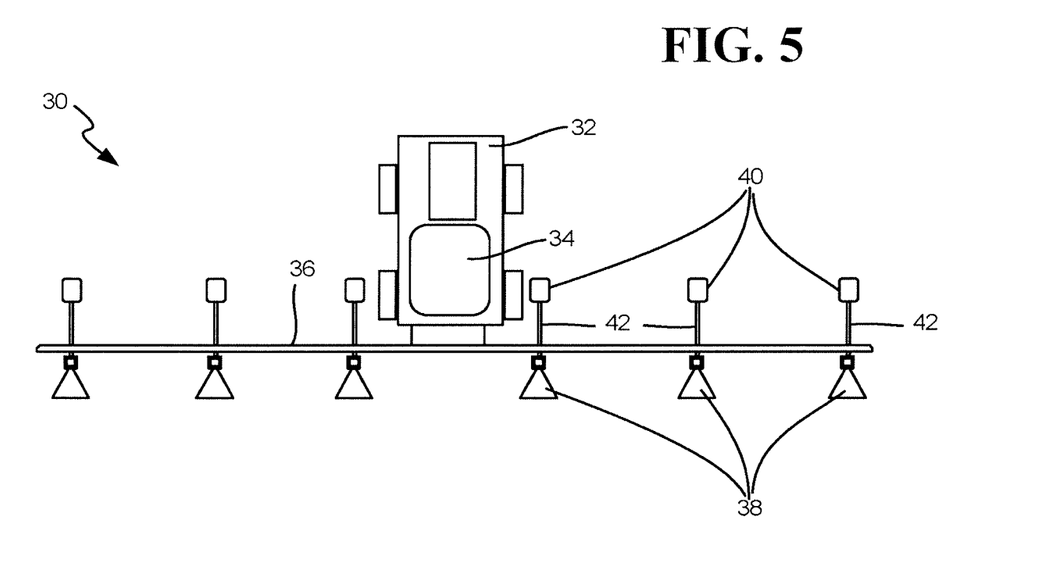
FIG. 5 is a schematic depiction of a sprayer system having a plant identification and selective spraying system, according to one embodiment which incorporates the shadow detection identification according to the present application.

FIG. 5 depicts a sprayer system 30, according to one embodiment. In this embodiment, the agricultural treatment system 30 has a prime mover 32, a spray tank 34, and a spray boom 36 having multiple spray nozzles 38 positioned along the boom, with each spray nozzle 38 operably coupled to a machine vision system 40 positioned on a mount 42. Such a sprayer system 30 intended for treatment of an agricultural field as utilized, according to one implementation, incorporating the necessary equipment to perform the various method embodiments disclosed herein. As shown in the figure, the system 30 has a prime mover 32, a spray tank 34, and a spray boom 36 having multiple spray nozzles or applicators 38 that are positioned along the crop rows as would be understood by one experienced in agricultural treatment. It should be understood that while the typical application is the treatment or spraying of selectively detected plants by a herbicide or other pesticide, other forms of treatment, for example selective mechanical removal are within the scope of the invention as would occur to the knowledgeable practitioner. The prime mover 30 in this embodiment and any other embodiment disclosed or contemplated herein can be any type of self-propelled device or system, including any known tractor or self-propelled sprayer system.

Figure 7:
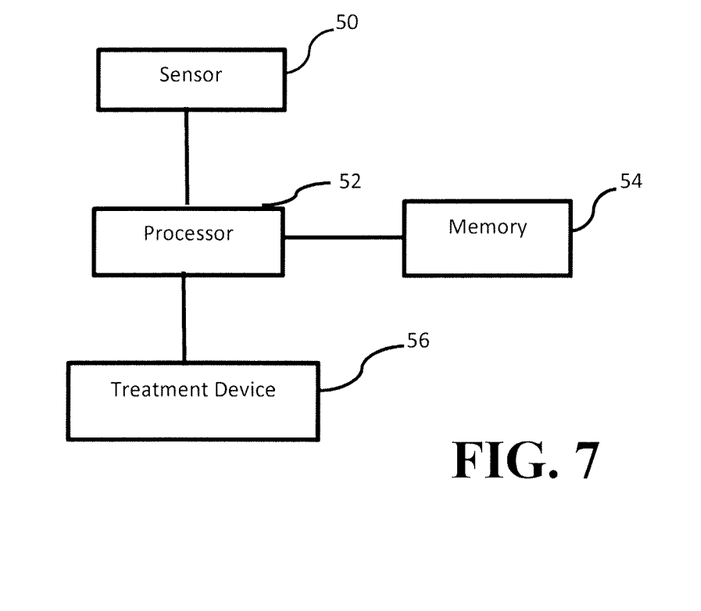
FIG. 7 illustrates exemplary processing hardware used in the present application.
Figure 8:
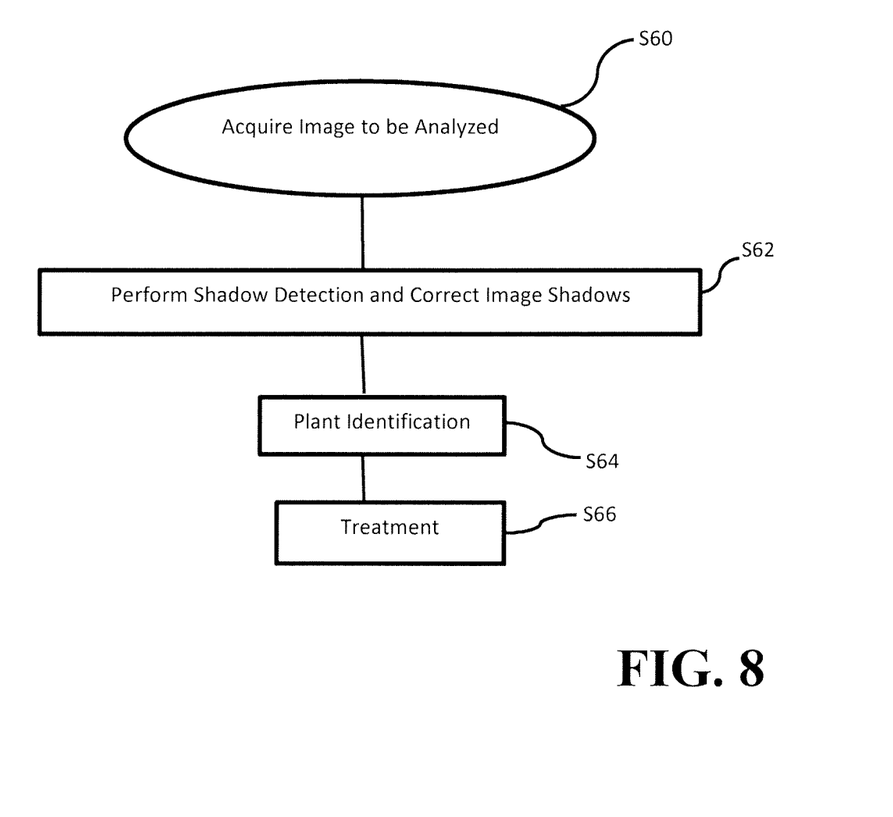
FIG. 8 depicts a flow chart of a method for machine vision vegetation identification and treatment, according to one embodiment.

Reference is now made to FIGS. 7 and 8 which respectively disclose a basic block diagram of the processing system (FIG. 7) of the present application and the basic algorithm utilized in accordance with the teachings of the present application (FIG. 8). In the sprayer system diagram of FIG. 5, the field to be treated is scanned by one or more sensors 50. Typically, each of these sensors 50 is associated with an individual treatment device such as each individual spray nozzle 38 positioned on the spray boom 36 so as to monitor the portion of the field treatable by that individual spray nozzle or applicator 38. Although the number of sensors 50 need not correspond to the number of treatment devices so long as their fields of view cover the track of the sprayer system, in a typical application, the sensors are equal in number to treatment devices.

The system is further provided with a processor 52 which may be desirably a pipeline processor such as described in International Application No. PCT/US15/29261. However, according to the teachings of the present application, the number of processors and their configuration may be varied as to meet the needs of a particular application. Note that the processor interacts with a memory 54 which temporarily stores image data for processing by the system of the present application and may also typically contains the programming used to process this image data in accordance with the teachings of the present application.

FIG. 8 of the present application discloses a high level embodiment for the machine vision vegetation identification and treatment system according to the present application.

At step S60, the image to be analyzed is acquired. As disclosed elsewhere in the present application, images are normally acquired at a rate of, for example, 30 frames per second and pass over each area of the agricultural field to be evaluated and processed.

According to the teachings of the present application, the detection of shadows as illustrated, for example, in FIG. 1 and the compensation of the intensity of the shadow areas is a principal focus of the present application so that the image may be processed to identify plants in this area. The objective of this treatment is to enable the uniform treatment of the agricultural field, despite shadows produced by the agricultural equipment, adjacent trees, or other structures or objects casting a shadow across the agricultural field. It should be noted, however, that the objective of the method of the present application is not to extract every possible shadow from the image. For example, the shadows cast by individual blades of grass or leaves of the plants being monitored are not intended to be within the scope of the compensation method of the present application. Thus, for example, whereas the bright region 10 includes fine shadows cast by the individual plant elements, the focus of the present application is to compensate for the larger shadow as cast in the shadowed region 12, case from a structure outside the image acquired in Step S60.

Figure 9:
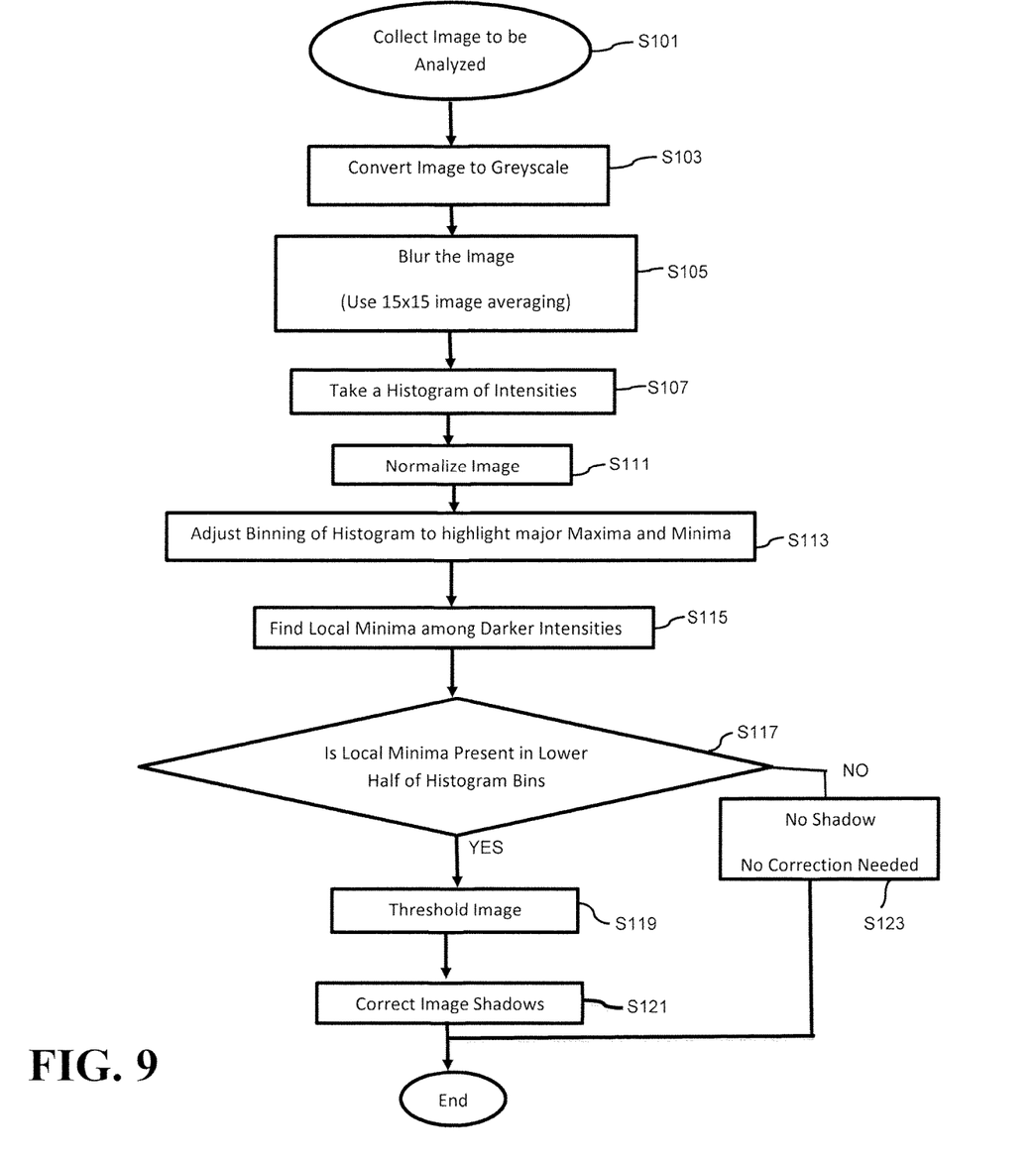
FIG. 9 depicts a flow chart for one embodiment of shadow detection and correcting according to the present application.

According to the teachings of the present application, shadow detection and the correction of image shadows is performed in Step S62, which step corresponds to the method described with respect to FIG. 9 of the present application. Once the shadows are corrected in accordance with the teachings of the present application as generally described in Step S62, a plant identification process is performed in Step S64. This plant identification process is described in greater detail with respect to FIG. 6 of the present application. Once plants are identified in Step S64, the system proceeds to the treatment of target plants in Step S66 as illustrated in FIG. 8. This plant identification and treatment is described in detail with respect to the above-mentioned PCT application, which is herein incorporated by reference.

The image acquisition step may desirably include pre-processing, which includes enhancing the image before the more extensive analysis of the image analysis and identification process. Standard pre-processing functions can include removing noise from the image, removing blemishes, masking areas of the image, and/or normalizing the image data. The shadow detection and correction method of the present application may be viewed as a particular form of pre-precessing but other forms of preprocessing may be performed to enhance the image for identification and treatment The plant identification performed in Step s64 of FIG. 8 may include segmentation, feature extraction and classification as described in greater detail in the above mentioned International Application PCT/US15/29261. The segmentation step involves dividing the image into regions. More specifically, "image segmentation" is defined for purposes of this application as the separation of the pixels in an image into segments or groups of pixels that are similar, for the purpose of reducing the complexity of the image data for further analysis. A standard use of image segmentation is to locate objects in an image. For example, if the requirement were to locate a red ball in an image, then the segmentation step would involve separating all the red pixels from all other pixels of any other color so that just the red pixels can be further analyzed.

In accordance with one embodiment of the system used for plant identification, the segmentation segments are "plant" and "non-plant." That is, any portion of the image that has captured a plant or a portion thereof will be designated as "plant," while any other portion will be designated as "non-plant." In certain implementations, if there is more than one plant in the image, those plants will be separated for analysis. As described in further detail below, the designation is based at least in part on a color attribute. In certain plant identification embodiments as disclosed and contemplated herein, the "plant" or "non-plant" designation is based at least in part on whether the object being analyzed is green. However, the color attribute in these identification systems is not limited to green. In those alternative implementations in which the object being analyzed is something other than a plant, the designation is based on any appropriate color attribute. In accordance with some embodiments, the plant identification process is complete upon completion of the segmentation step.

Feature extraction is typically a second step of the image identification process and, in certain embodiments, relates to the extraction of meaningful/unique plant features from the plant portions of the image. These features are those characteristics that distinguish the plant from other plants. In alternative embodiments relating to identification of other (non-plant) objects, the features would be those that distinguish the target object from other objects. The next step is typically classification, which may be the last step of the image identification process and relates to classifying the features extracted in the previous step into different plant categories.

The final step is typically treatment as shown in step S66 of FIG. 8 performed by the Treatment Device 56 of FIG. 7 which may typically be a spray nozzle 38 of FIG. 5. In the implementations relating to weed identification and spraying, in this step, the system utilizes the information from the plant image identification process to control a selective application system configured to selectively apply pesticide to those plants identified as weed plants. Alternatively, in systems unrelated to weed spraying, the system utilizes the information from the object image identification process to actuate and/or control a system configured to perform some action based on the identification of the target object. This may be mechanical extraction, mechanical removal of some portion of a crop plant or the selective application of a beneficial agricultural chemical to a crop plant.

Figure 6:
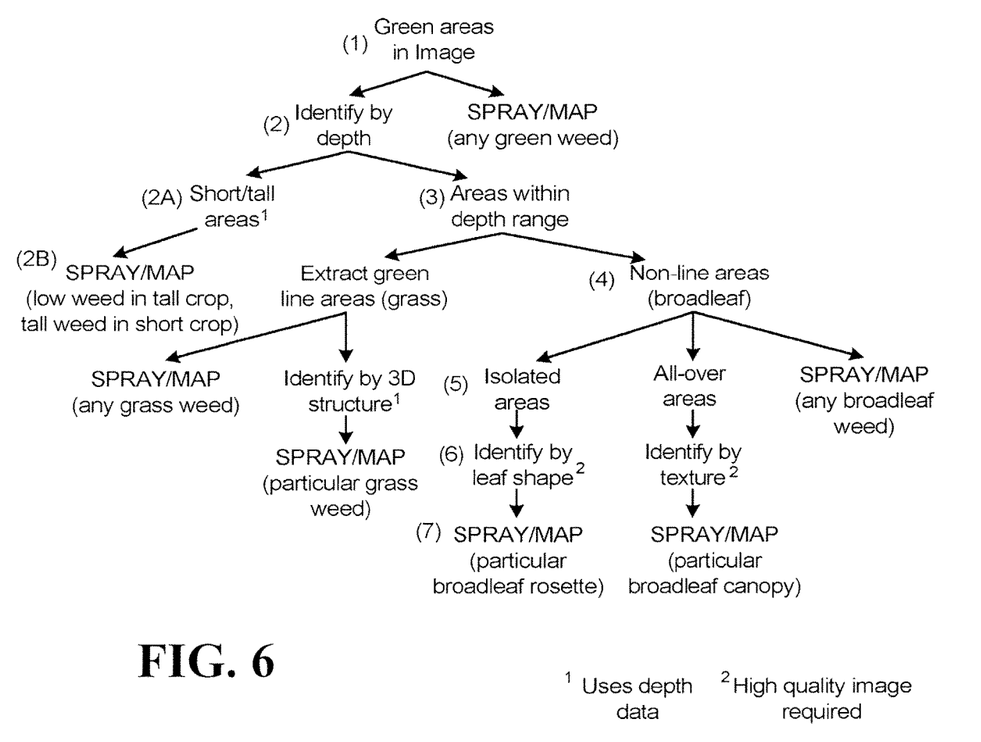
FIG. 6 depicts a flow chart of a method for machine vision vegetation identification, according to one embodiment in which the present shadow detection process and system is used.

Returning to the plant identification process the identification process is generally configured to identify a plant via a machine vision vegetation identification process such as, for example, the process set forth in the decision tree depicted in FIG. 6. The decision tree has criteria at each decision point based on image attributes (which are obtained using segmentation, and optionally using feature extraction and classification, as explained elsewhere herein).

It is understood that, prior to use of the system, a database is developed containing profiles of various target plants requiring identification in a particular crop, field, or situation. This database is stored in Memory 54. Each species profile may be pre-defined based upon the image attributes and contains data relating to various characteristics unique to the species, such as color, size, shape, texture, height, and leaf type (grass or broadleaf), etc. Once the desired profiles are saved in the database, the system can use the identification process such as that set forth in the decision tree of FIG. 6 to identify a specific plant. That is, the species profile provides the criteria to be met at each decision point in the decision tree.

In one exemplary embodiment, identification of a fleabane plant at rosette growth stage would occur as follows using the decision tree in FIG. 6. In this example as set forth in the figure, the identification and action processes occur utilizing the following criteria in the decision tree for the fleabane plant: (1) green areas in image; (2) identify by depth; (3) areas within depth range; (4) non-line areas (broadleaf); (5) isolated areas; (6) identify by leaf shape; and (7) spray or map. Each of these decision points in the tree are part of a real-time identification process, such as the process shown in FIG. 1, and further can be identified as part of one of the steps of the process. For example, decision points 1 through 3 of this example as set forth above are part of the segmentation step. Further, decision points 4 and 5 are part of the optional feature extraction step, while decision point 6 is part of the optional classification step and decision point 7 is action/administration, in the typical case activation of the treatment device 56 to perform treatment at S66.

FIG. 6 includes those stages of the process where an "action" can occur if required. For example, if the system determines that a specific plant is a weed as a result of the process described in the flowchart of FIG. 6, the system will be triggered to spray the weed with a pesticide. Alternatively, another action is to "map" the plant. The "map" action relates to storing the plant's GPS position (with GPS coordinates) for later use.

According to an alternative exemplary embodiment, identification of an Italian cocklebur (*Xanthium italicum*) plant two month growth stage would occur as follows using the decision tree in FIG. 6. In this example as set forth in the figure, the identification and action processes occur utilizing the following criteria in the decision tree for the Italian cocklebur plant: (1) green areas in image; (2) identify by depth; (2A) areas outside of depth range; and (2B) spray or map. Each of these decision points in the tree are part of a real-time identification process, such as the process shown in FIG. 1, and further can be identified as part of one of the steps of the process. Thus, in this example, decision points 1 and 2 of this example as set forth above are part of the segmentation step. Further, decision point 2A relates to the filtering process associated with segmentation as discussed in further detail below, while decision point 2B relates to action/administration.

One implementation of the segmentation process (such as the segmentation step as set forth in the embodiment depicted in FIG. 1) will now be examined in detail. In accordance with certain implementations, the segmentation process is a real-time segmentation process that can quickly segment and isolate weed plants from crop plants or fallow with a high level of tolerance to occlusion in traditional and no-till situations. It can be used in fields containing crop plants at differing growth stages (i.e., different leaf shapes, heights, or colors) to distinguish those crop plants from weed plants, stubble, and in fallow situations.

FIG. 9 is a flowchart of one embodiment of the shadow detection and correction of Step S62 of FIG. 8, which is described in greater detail in FIG. 9. In FIG. 9, at Step S101, the image to be analyzed is first collected. Within the contemplation of the present application, this image will be typically color image information as the plant identification process of Step S64 preferably utilizes color as an attribute to facilitate the plant identification process. However, for the purpose of the detection and extraction of shadows from the image, the image is typically converted to a grayscale or black and white image at Step S103. At Step S105, the image is blurred. Blurring may be performed of the image data either before or after grayscale conversion. In FIG. 9, the image blurred after conversion to a grayscale image at Step S105.

This is an important step as it is preferably used to enable the system to operate effectively in no till and other situations where stubble and crop residual is present. The reason for the blur, and is to homogenize the bright and shadow areas in the image prior to production of the thresholded image. In this way, if there is bright residue in the shadow area 12 it will show up as a bright area and similarly if there are dark areas in the bright area 10 they will show up as shadowed (e.g black soil showing in a no-till wheat stubble). The large blur effectively melts these intensities together and the most dominant intensity rules. In this way, the contrast produced by the shadows of individual leaves or dark soil patches are not removed from the image unintentionally. Instead, according to the teachings of the present application, only large shadow areas, such as those produces by equipment and other structures and trees outside the image are identified. Therefore, the dark areas are dark and the bright areas are bright. Preferably, the blur is performed by averaging (with or without weighing) the pixel on interest with adjacent or nearby pixels. The degree of this smoothing is adjusted to preserve maximum image information in the corrected image data output at step S125 while removing the large shadow areas.

Figure 4:
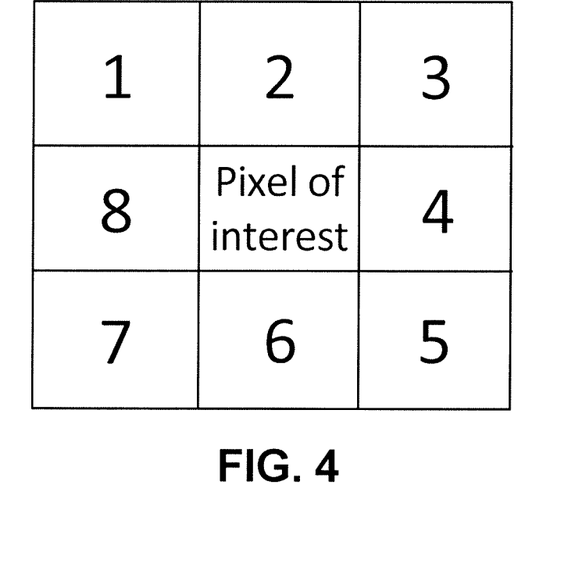
FIG. 4 is a diagram depicting a specific smoothing process: a pixel intensity averaging process, according to one embodiment.

The smoothing (also referred to as "averaging" or "blurring") process (which can be accomplished using a known averaging filter, mean filter, Gaussian blur, or median filter, for example) is a known process used to "smooth" or "blur" an image. In one exemplary embodiment, a known averaging filter is used to produce the blur in the following fashion. The main idea of the averaging process is to run through the image pixel by pixel, replacing the specific pixel intensity value of each pixel of interest with the median intensity value of neighboring pixels based upon a "window" of pixels surrounding that pixel of interest. As an example, FIG. 4 depicts a 3×3 window (a window that is sized to capture an area that is 3 pixels wide and 3 pixels high) with the pixels around the pixel of interest numbered as shown. It is understood that any other known window size can be used, such as a 10×10 or 20×20 window. Preferably the window has an odd number of pixels so that it is may be symmetrical amount the pixel being smoothed or blurred. Depending on image resolution, it is anticipated that the step S105 will desirably use a relative large window (for example 15×15). The averaging may be by weighing each pixel with a multiplier based on the distance from the pixel being smoothed. For example, adjacent pixels may be fully averaged, pixels removed by one intermediate pixel may be weighted by, for example, 0.85, pixels removed by two intermediate pixels by 0.55 or any other weighing scheme effective to blur the image.

In the example of FIG. 4, the pixel intensity value inserted in the pixel of interest is the value resulting from the sum of the intensity values of pixels 1 to 8, which is then divided by 8 to arrive at the mean intensity value. It is understood that the pixel intensity can be representative of the color, saturation, heat, or other actual features of the image, depending on the source of the radiating energy. In the context of images, the end result of this process is that the intensity of the pixels are averaged, thereby lowering the contrast (range of pixel intensities) within the bright areas and dark areas. Alternatively, instead of smoothing, a known process of reducing the quantization levels of the image could be used.

Figure 2:
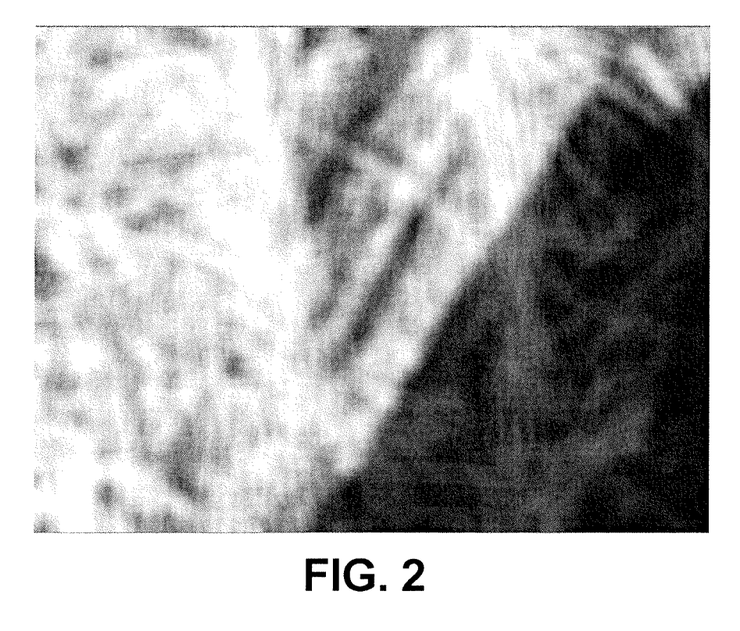
FIG. 2 is a version of the image of FIG. 1 that has been smoothed or blurred via a smoothing process, according to one embodiment.

FIG. 2 depicts a smoothed or "blurred" version of the image of FIG. 1 after going through the averaging process described above. As can be seen in the figure, the brightest bright spots of the bright region 10 have been lowered in intensity, while the dark areas of the shadowed region 12 have been made more homogenous (been "smoothed" such that specific objects are more difficult to identify).

In certain implementations, the amount of smoothing or blurring required can vary depending on the resolution and dynamic range of the image in question. For example, for an image captured with a 640×480 resolution camera with a dynamic range of 50 db, an averaging over a 10×10 window to a 20×20 window is satisfactory. If the amount of smoothing is too much, the image will be smoothed to the point where the bright and dark portions are less distinguishable (less separable) and smaller shadows can go undetected. If the amount of smoothing isn't enough, the data has too much resolution and inadequate peaks may be produced in the histogram.

Once the image has been smoothed, in step S107 of FIG. 9, a histogram of the pixel intensities is created with a bin size that depends on the resolution and dynamic range in the image. A bin is what the pixel values are sorted into. For example, if the intensity data is 8 bit and thus has 256 levels and a bin size of 128 is used, there would only be 2 bins, because the pixel intensity range is between 0 and 255. That is, all pixels with a value of 128 or less would be sorted into Bin 1, and all pixels with a value greater than 128 would be sorted into Bin 2. Hence, if there were 2,500 pixel values of 128 or lower, then Bin 1 would have the value of 2,500 in it, while Bin 2 would hold the number of pixels above 128.

Figure 3:
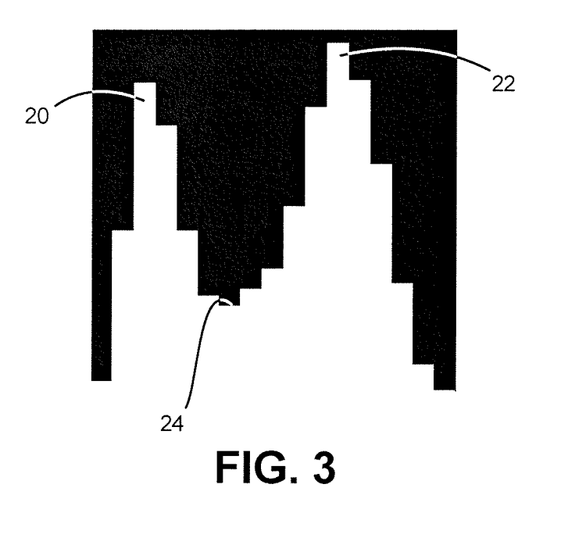
FIG. 3 is a histogram depicting a summary of the pixel intensities of the image of FIG. 2, according to one embodiment.

In the exemplary image depicted in FIG. 2, a bin size of 16 was used. Thus, image intensity data is binned into 16 bins. The histogram can be used to identify the bright regions and shadow regions in an image such that no shadow regions go undetected. FIG. 3 depicts the histogram summarizing the pixel intensities of the averaged image of FIG. 2. In a histogram, the bright and dark areas are seen as separate peaks in the histogram with the size of the peaks relative to the size of the shadow and bright regions. The histogram of FIG. 3 has two peaks 20, 22 because, as discussed above, there are two regions in the image of FIG. 1: one bright region 10 and one shadow region 12. The more regions in the image, the greater the number of peaks. The original image of FIG. 1 captures a scene generated from a camera pointing down at the ground—it doesn't capture any skyline. If the skyline were included in the image, there would potentially be three peaks in the histogram of FIG. 3. In contrast, if the scene had only one region (either entirely a bright region or entirely a shadow region), the histogram would have only one peak.

The histogram is then used to identify the shadowed regions in the original image. More specifically, an intensity threshold is determined by identifying the minima between two peaks in the histogram. For example, with respect to the histogram in FIG. 3, the minima 24 is the lowest point between the two peaks 20, 22. The minima is used to determine the intensity threshold by obtaining the bin number of the minima (which is 7 in the example set forth in FIG. 3) and multiplying by the bin size (which is 15 in the example). Therefore, the intensity threshold value in this specific example would be 115 (7×15).

The histogram is not always bi-modal. For example, the sky will typically produce a third histogram peak of relatively bright intensity. In practice, the image is normalized at this point at step S111. The binning for the histogram is changed at step S113 to provide a smoothing of the histogram as well as highlight only the major maximums and minimums. (FIG. 2). Desirably, the histogram has only two peaks with the peak within the darker bins representing the shadow. Thus, if there are more than two peaks, only the minima between the darkest intensity histogram peak and adjacent peak is normally considered.

The first local minimum from the left-hand side i.e defining the lower intensities of the histogram is therefore used to produce a threshold map and the other minima are normally disregarded. The method finds this lower intensity minima at step S115. Only this lower intensity minima is used because the image is not strictly bimodal and can have several peaks and troughs in it. For example if the live foliage is interspersed with dark areas of soil and light areas of prior dead plant material such as stubble or other residue, there may be several intensity peaks. The presence of this peaks depends on the amount of residual plant material and soil, colour of soil and colour of residual plant material. Thus, the location of the local minima is reviewed to determine if it is a lower part, typically the lower half, of the histogram at step S117. The intensities can also only have one peak and if the first minima is not found lower than 128 on a 256 bit image, it is considered as a no shadow in image output. (FIG. 2) Thus step S117 determines whether this lower local minima is present in the lower portion of the histogram. If no such local minima is detected in step S117, the system determines that there is no shadow to correct and no shadow correction is performed, see step S123.

The threshold can then be applied to the blurred image in step S119 to create a mask according to a known process and thereby identify the shadowed regions as white and the well-lit areas as black. For example, in one embodiment, the mask is a binary mask image, which is an image in which the image pixels are in one of two states: a zero for pixel areas of no interest and a 1 for pixel areas of interest (alternatively, the two states can be 0 and 255 so that all areas of interest appear white and all areas of no interest are black). Alternatively, the mask can be any known image, map, array, or vector of shadow and non-shadow regions associated with the original image. Subsequently, the mask can then be overlaid on the original image of FIG. 1 to identify the shadowed region(s).

Once the shadow area is determined by the mask, the intensity values within the shadow may be corrected by increasing the intensity in these areas with a selected method at step S121. For example all image intensities with the shadow area may be multiplied by a multiplier. In one embodiment the image may be entirely greyscale or luminance of a luminance-chrominance signal may be adjusted. In another embodiment, all RGB color values of an RGB signal may be corrected in the same way with the same processing.

Figure 10:
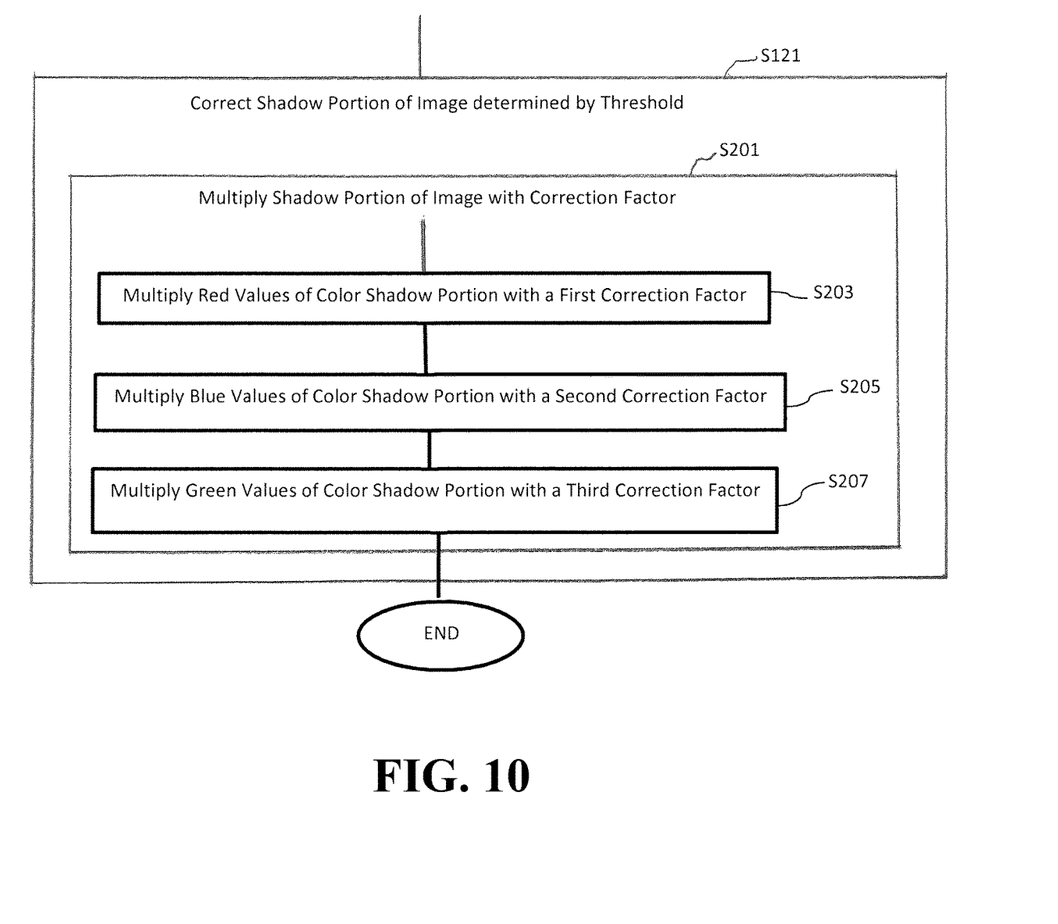
FIG. 10 depicts one embodiment of the shadow detection of S121 of FIG. 9.

FIG. 10 shows an example of the Correction of shadow portions of the image at step S121 of FIG. 9 for a color image in accordance with one preferred embodiment. In this example, at step S201, each of the pixels of the Shadow Portion of the Image is multiplied with a correction factor.

A different correction factor may be used to correct each colour image. In steps S203, s205 and s207, different correction factors may be used for different colors. In one preferred embodiment, the red values within the shadow mask are multiplied in step S203 by 2.5, the green values are multiplied in step S205 by 2.25 and the blue values are multiplied in step S207 by 2. However, the individual colors may be corrected as would occur to a skilled artisan from the explanation herein.

According to one embodiment, a correction technique mentioned above that employs a camera aimed at the light source can be employed at this point to compensate for any inconsistent lighting. That is, the technique provides for adjustment of the white balance of a resulting image based on detection of the white balance of the light source using an algorithm as described in the above identified White Balance application.

Further, according to one implementation, the shadow region can further be corrected according to the following process. First, the average intensity values for red (R), green (G) and blue (B) are determined for the light area.

The average light values are calculated in the following fashion. The original mask of the shadow region is dilated and stored as the minimum light image and maximum light image according to a known process. The maximum light image is then dilated and the difference between the minimum and maximum light images is used as a mask to determine the average RGB light values of the scene image.

Further, the average dark values are calculated as follows. The original mask of the shadow region is eroded and stored as the minimum dark image and the maximum dark image in accordance with a known process. The maximum dark image is then eroded further. The difference between the minimum and maximum dark images is then used as a mask to determine the average RGB dark values of the scene image.

The gain required for each channel in the dark area to increase the RGB values to a level similar to the light area is calculated as follows: average light value/average dark value for RGB. This value is then applied to the area of the image under the shadow mask region. This corrects for color.

There is a known issue for those images that capture scenes in which there is stubble present that has been pushed over (stubble that is bent over so that a substantial length of each piece of stubble is horizontal to the ground). The issue is that it is possible that the gains calculated above will not be large enough to compensate for the intensity drop in the pixels capturing the dirt/ground between the pieces of pushed over stubble, because they will remain dark. However, this is typically not a problem as the plant material is usually found above the "pushed over" stubble.

According to a further embodiment, any plant material in the image can be identified in the following manner. The image can be binarised such that black represents non-plant material and white represents plant material with a pixel comparison of plant material. It is understood that there are numerous machine techniques that can be used to identify plant material in a color image, such as: G>R and G>B or a modified version of this formula to enhance green. If there are binarised contiguous white areas greater than a predetermined size, then there is plant material present. The predetermined size should be large enough to cut out noise but small enough to keep small plants.

Although the present invention has been described with reference to preferred embodiments, persons skilled in the art will recognize that changes may be made in form and detail without departing from the spirit and scope of the invention.

What is claimed is:

1. In a system for treating agricultural fields where objects in the field are detected and the field is selectively treated in substantial real time, a method of shadow detection and extraction to enable improved detection of objects in the field partially masked by shadow, the method comprising:
   obtaining an original image of the field to be evaluated for treatment;
   applying a smoothing filter to the original image to create a smoothed image;
   developing a histogram of the intensity of pixels in the image;
   identifying a minima in a lower range of image intensity bins and using the local minima as an intensity threshold of the smoothed image; and
   creating a mask based on the intensity threshold determined in said identifying, the mask identifying areas of lower image intensity to identify shadows cast over the image; and
   enhancing the intensity of image pixels within the shadow mask area to thereby attenuate the effect of shadow on the image and form an enhanced original image;
   the enhanced original image being used to detect objects in the field to enable selective treatment of said field.

2. The method of claim 1 further comprising,
   detecting objects of interest in the enhanced original image to facilitate treatment of said field;
   using information as to said detected objects of interest to enable treatment of the field.

3. The method of claim 2 wherein said objects detected in the field are weeds and the system further treating the weeds by the select application of a pesticide.

4. The method of claim 3 wherein the select application of a pesticide is by spraying.

5. The method of claim 4 wherein the obtaining an original image of the field to be evaluated for treatment is performed by taking an image of the field from one or more cameras mounted on a prime mover.

6. The method of claim 5 wherein the system is mounted to a prime mover for translation across a field, the system including a boom supporting said cameras and said sprayers, the processor processing the images produced by said cameras and instructing the sprayers to selectively apply pesticide on weeds.

7. The method of claim 1, wherein the applying the smoothing filter comprises replacing a pixel intensity value of each pixel of interest in the image with a mean intensity value of neighboring pixels.

8. The method of claim 7, wherein the neighboring pixels comprise a window of pixels surrounding the pixel of interest.

9. The method of claim 1, wherein the providing the original image comprises obtaining the original image as a grayscale image, a color image, a depth image, a fluorescence image, a thermal image, or an infrared image.

10. The method of claim 9, wherein the obtaining the original image as a grayscale image comprises capturing the original image in the grayscale image or converting a color representation of the original image to the grayscale image.

11. The method of claim 1, wherein the mask comprises a binary mask image.

12. The method of claim 11, wherein the enhancing of the intensity of image pixels within the shadow mask area multiplies each color of each pixel with a multiplier when within a shadow region as identified by said mask.

13. A system for treating agricultural fields where objects in the field are detected and the field is selectively treated in substantial real time, the system including shadow detection and extraction to enable improved detection of objects in the field partially masked by shadow to better enable treatment of the field, comprising:

a processor and a memory, the processor being configured to, obtain an original image of the field to be evaluated for treatment;

apply a smoothing filter to the original image to create a smoothed image;

develop a histogram of the intensity of pixels in the image;

identify a minima in a lower range of image intensity bins and using the local minima as an intensity threshold of the smoothed image;

create a mask based on the intensity threshold determined in said identifying, the mask identifying areas of lower image intensity to identify shadows cast over the image; and enhance the intensity of image pixels within the shadow mask area to thereby attenuate the effect of shadow on the image and form an enhanced original image;

the enhanced original image being used to detect objects in the field to enable selective treatment of said field.

14. The system of claim 13, the system further comprising:

a vision system operably coupled to said processor, the vision system configured to capture at least one original image of the field; and said processor being further configured to identify objects within the enhanced original image to produce object identification data; and a treatment device receiving said object identification data and treating said field on the basis of said data.

15. The system of claim 14 wherein said objects detected in the field are weeds and said treatment device includes one or more sprayers that selectively spray the weeds with pesticide.

16. The system of claim 14 wherein the obtaining an original image of the field to be evaluated for treatment by said vision system taking an image of the field from one or more cameras mounted on a prime mover.

17. The system of claim 16 wherein the system is mounted to a prime mover for translation across a field, the system including a boom supporting said cameras and said sprayers, the processor processing the images produced by said cameras and instructing the sprayers to selectively apply pesticide on weeds.

18. The system of claim 1, wherein the processor applies the smoothing filter by replacing a pixel intensity value of each pixel of interest in the image with a mean intensity value of neighboring pixels.

19. A non-transitory computer readable medium having a program stored thereon for performing the method of claim 1.

* * * * *